（12) United States Patent
Felts et al.

(10) Patent No.: US 9,930,129 B2
(45) Date of Patent: Mar. 27, 2018

(54) SYSTEM AND METHOD FOR JAVA EE AND JAVA SE PROXY DATA SOURCES IN A MULTITENANT APPLICATION SERVER ENVIRONMENT

(71) Applicant: Oracle International Corporation, Redwood Shores, CA (US)

(72) Inventors: Stephen Felts, Denville, NJ (US); Jagadish Ramu, Bangalore (IN); Prasad Subramanian, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 241 days.

(21) Appl. No.: 14/860,513

(22) Filed: Sep. 21, 2015

(65) Prior Publication Data

US 2016/0088108 A1 Mar. 24, 2016

Related U.S. Application Data

(60) Provisional application No. 62/054,915, filed on Sep. 24, 2014.

(51) Int. Cl.
*G06F 15/173* (2006.01)
*H04L 29/08* (2006.01)

(52) U.S. Cl.
CPC .......... *H04L 67/28* (2013.01); *H04L 67/1021* (2013.01); *H04L 67/1097* (2013.01)

(58) Field of Classification Search
CPC .. H04L 67/28; H04L 67/1021; H04L 67/1097
See application file for complete search history.

(56) References Cited

U.S. PATENT DOCUMENTS

| | | | |
|---|---|---|---|
| 2004/0030627 A1* | 2/2004 | Sedukhin | G06Q 40/00 705/36 R |
| 2006/0036448 A1* | 2/2006 | Haynie | G06Q 10/10 705/37 |
| 2007/0240127 A1* | 10/2007 | Roques | G06F 8/315 717/136 |
| 2012/0124353 A1* | 5/2012 | Rehman | G06F 9/542 713/1 |

* cited by examiner

*Primary Examiner* — Richard G Keehn
(74) *Attorney, Agent, or Firm* — Tucker Ellis LLP

(57) ABSTRACT

In accordance with an embodiment, described herein is a system and method for supporting proxy data sources in a multitenant application server environment, such as Java SE and Java EE environments. In multitenant environments, various tenants can have data sources that an administrative application can access without needing to know the actual data sources. A system and method provide a proxy data source mechanism such that applications in Java EE and Java SE environments can access tenant data sources, each tenant data source having a JNDI name that is tenant or partition specific, through the proxy data source, the proxy data source comprising a JNDI name which is not tenant or partition specific. The proxy data source can also provide for switching between tenant data sources based upon a caller context.

20 Claims, 9 Drawing Sheets

SYSTEM AND METHOD FOR JAVA EE AND JAVA SE PROXY DATA SOURCES IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR JAVA EE AND JAVA SE PROXY DATA SOURCES IN A MULTITENANT APPLICATION SERVER ENVIRONMENT", Application No. 62/054,915, filed Sep. 24, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for Java EE and Java SE proxy data sources in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

SUMMARY

In accordance with an embodiment, described herein is a system and method for supporting proxy data sources in a multitenant application server environment, such as Java SE and Java EE environments. In multitenant environments, various tenants can have data sources that an administrative application can access without needing to know the actual data sources. A system and method provide a proxy data source mechanism such that applications in Java EE and Java SE environments can access tenant data sources, each tenant data source having a JNDI name that is tenant or partition specific, through the proxy data source, the proxy data source comprising a JNDI name which is not tenant or partition specific. The proxy data source can also provide for switching between tenant data sources based upon a caller context.

DETAILED DESCRIPTION

In accordance with an embodiment, described herein is a system and method for supporting proxy data sources in a multitenant application server environment, such as Java SE and Java EE environments. In multitenant environments, various tenants can have data sources that an administrative application can access without needing to know the actual data sources. A system and method provide a proxy data source mechanism such that applications in Java EE and Java SE environments can access tenant data sources, each tenant data source having a JNDI name that is tenant or partition specific, through the proxy data source, the proxy data source comprising a JNDI name which is not tenant or partition specific. The proxy data source can also provide for switching between tenant data sources based upon a caller context.

Application Server (e.g., Multi-Tenant, MT) Environment

Figure 1:
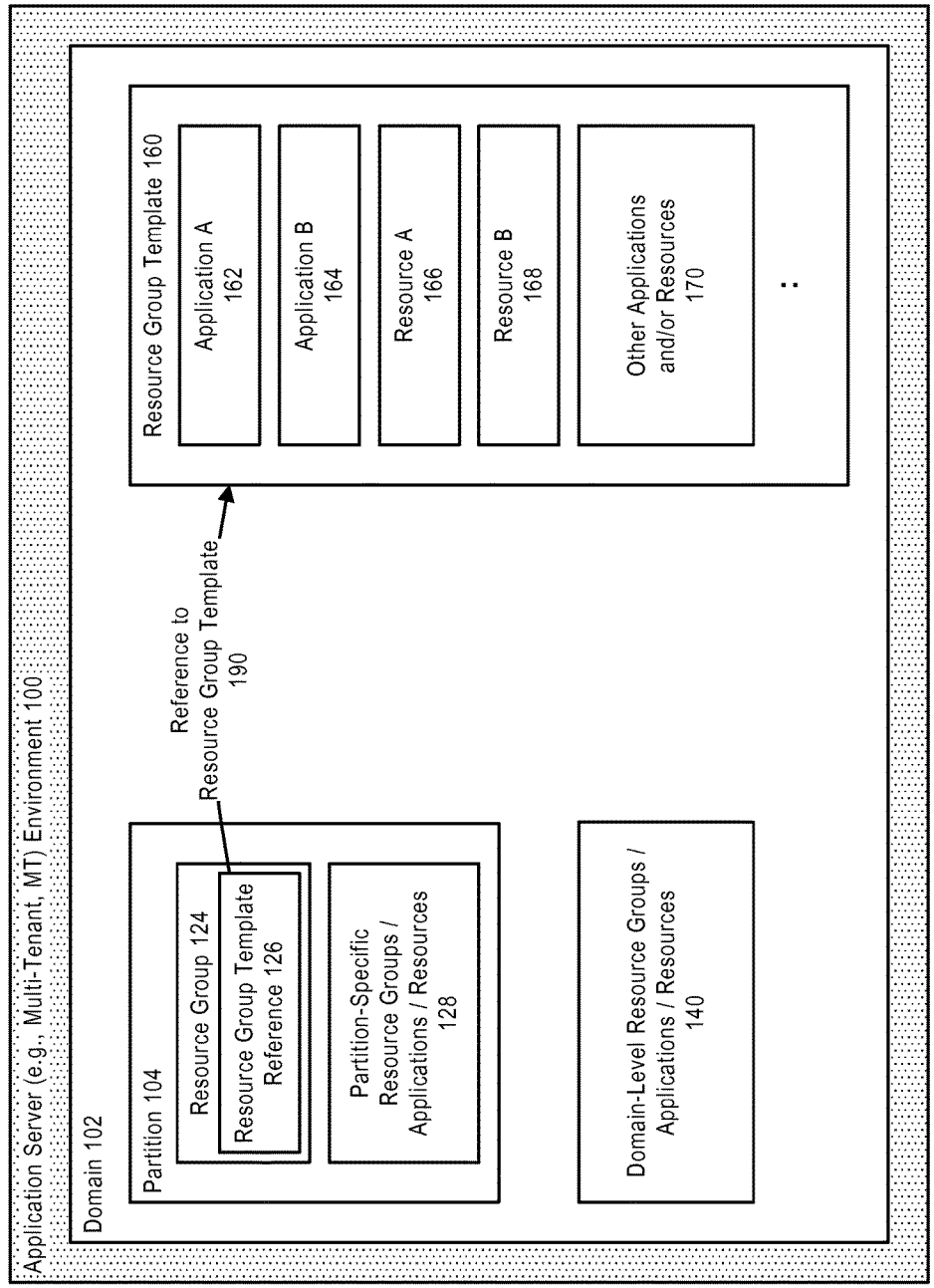
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
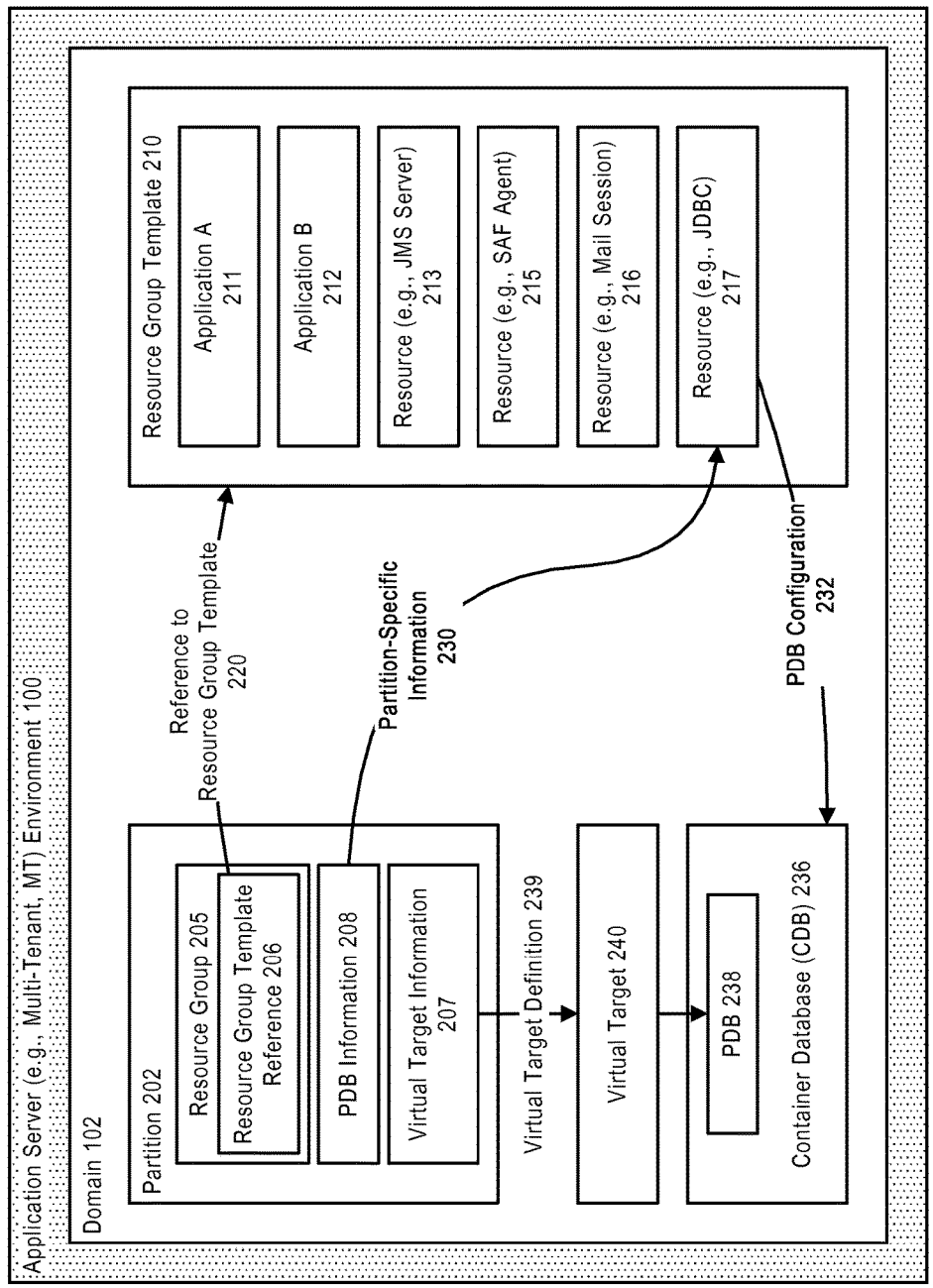
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
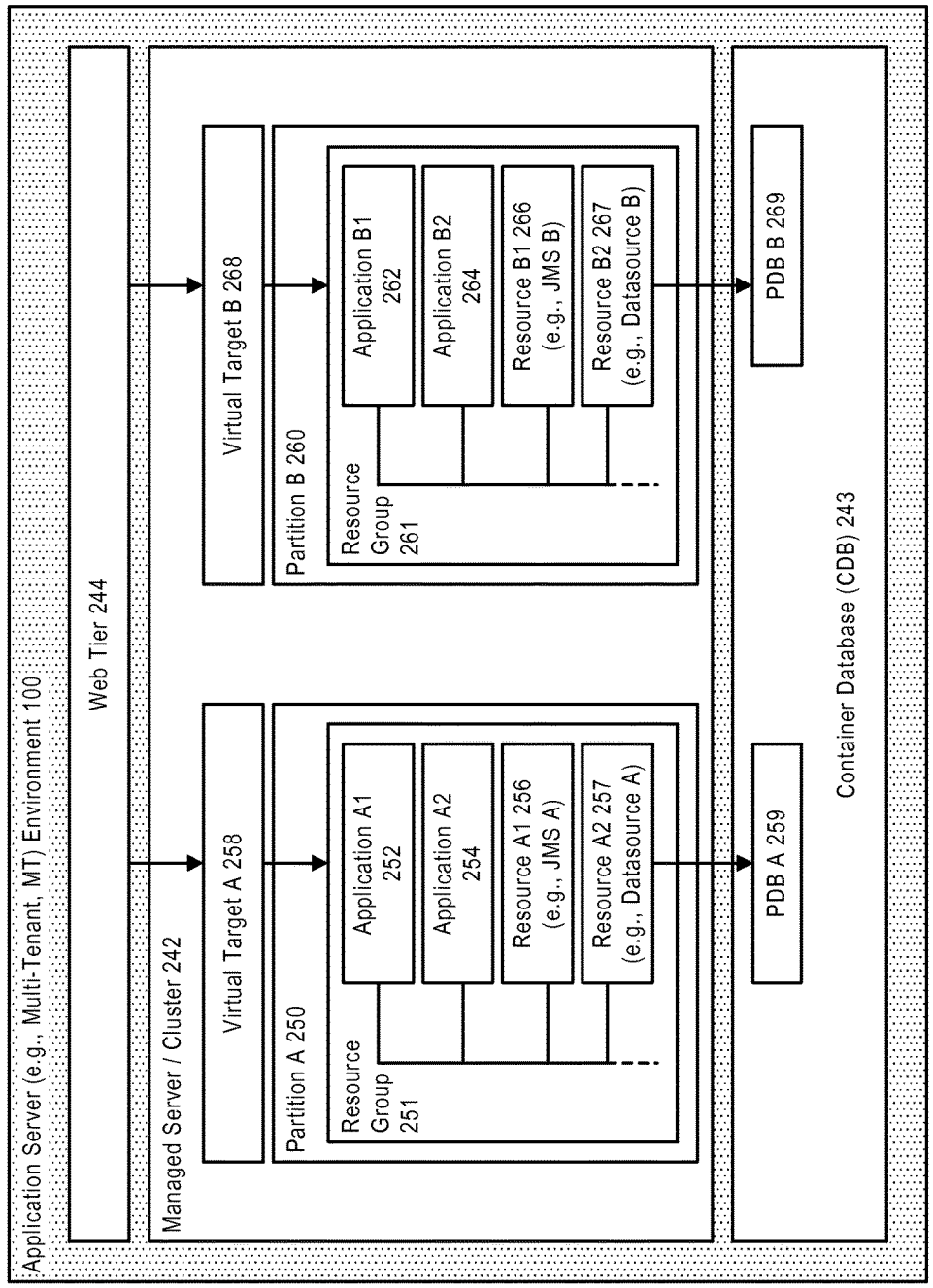
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
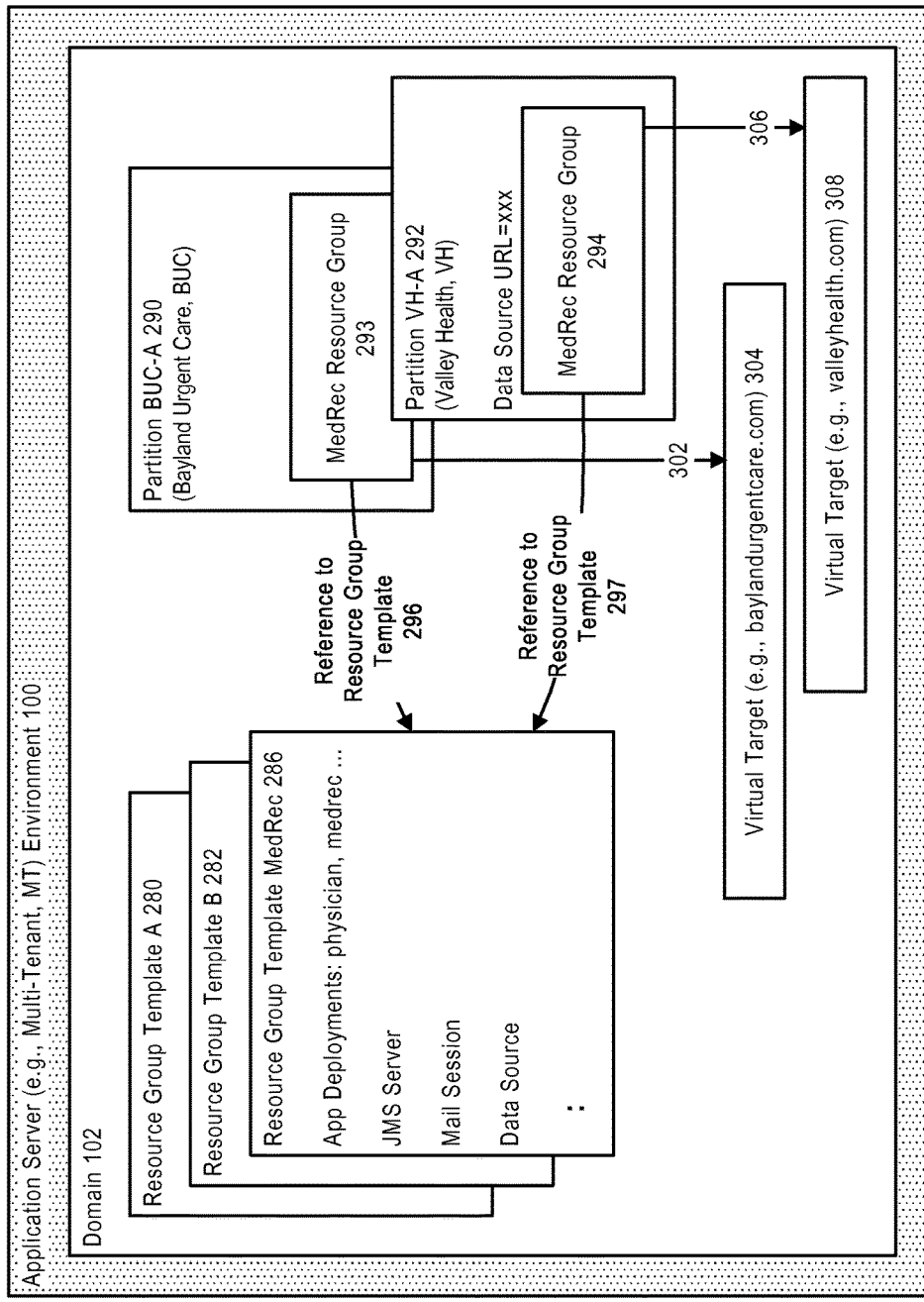
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
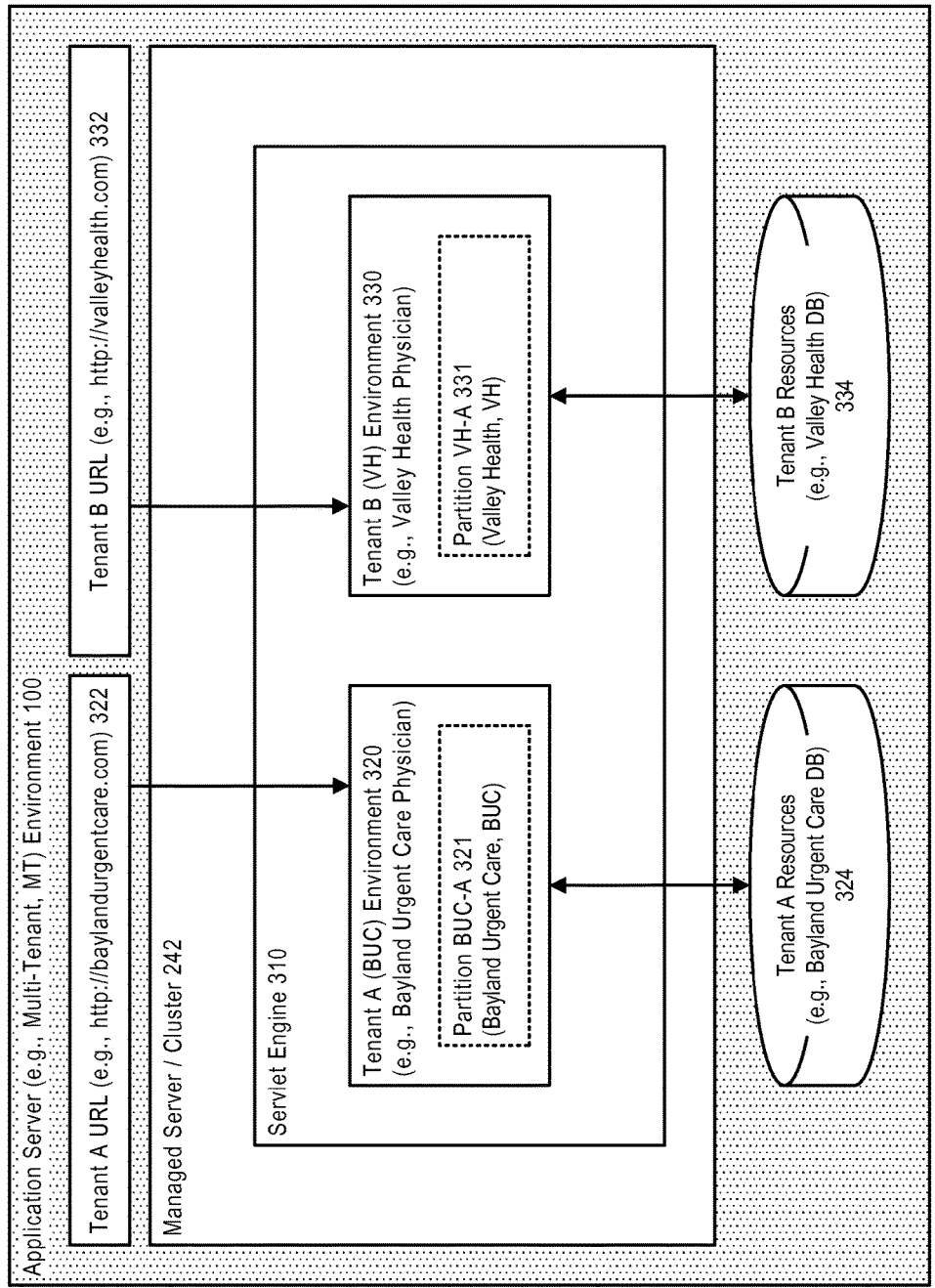
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Proxy Data Source

In accordance with an embodiment, within an application server environment, such as a multitenant application server environment, resources, such as data sources (DS) can be replicated for each tenant. In Java EE (Java Enterprise Edition) and Java SE (Java Standard Edition) environments, it is desired to implement a method and system to access such replicated DS resources by using the same name without an administrative application needing to know the real DS. A proxy DS can be provided such that applications in the Java-EE and Java-SE environments can look up the DS with a JNDI name which is not tenant or partition specific. Additionally, separate DS can be created, e.g., for tenants, and the proxy DS can ensure that communication to a tenant DS is established.

In accordance with an embodiment, when applications communicate with a proxy DS, depending on current tenant context of the application/thread, the proxy DS can provide a mechanism to communicate with an underlying DS, the underlying DS corresponding to the tenant associated with the current tenant context of the application/thread. The proxy DS can further provide a callback interface that can be implemented to perform data source switching based on the context in the environment (e.g., partition, tenant, and the like)

In accordance with an embodiment, multitenant applications, such as multitenant Fusion MiddleWare components (FMW components), can utilize proxy DS in conjunction with switchPDBWithTenant functionality, although it can be used in pure WebLogic Server environments as well.

In accordance with an embodiment, a mechanism can be provided that allows access to a data source by name without an application needing to know the naming conventions, context names (partitions or tenants), and the like. In accordance with an embodiment, a proxy data source enables access to underlying data sources. Processing associated with an application can still occur in the underlying data source, to which the proxy DS points, i.e., the underlying data sources actually handle deployment, management, security, etc. The proxy data source provides beyond an external implementation: a standard way to handle this proxy data source feature—built-in configuration, life-cycle, and monitoring; and, a way to avoid significant overhead in processing simply to switch to access another data source.

Proxy and Tenant Data Source Setup

Figure 6:
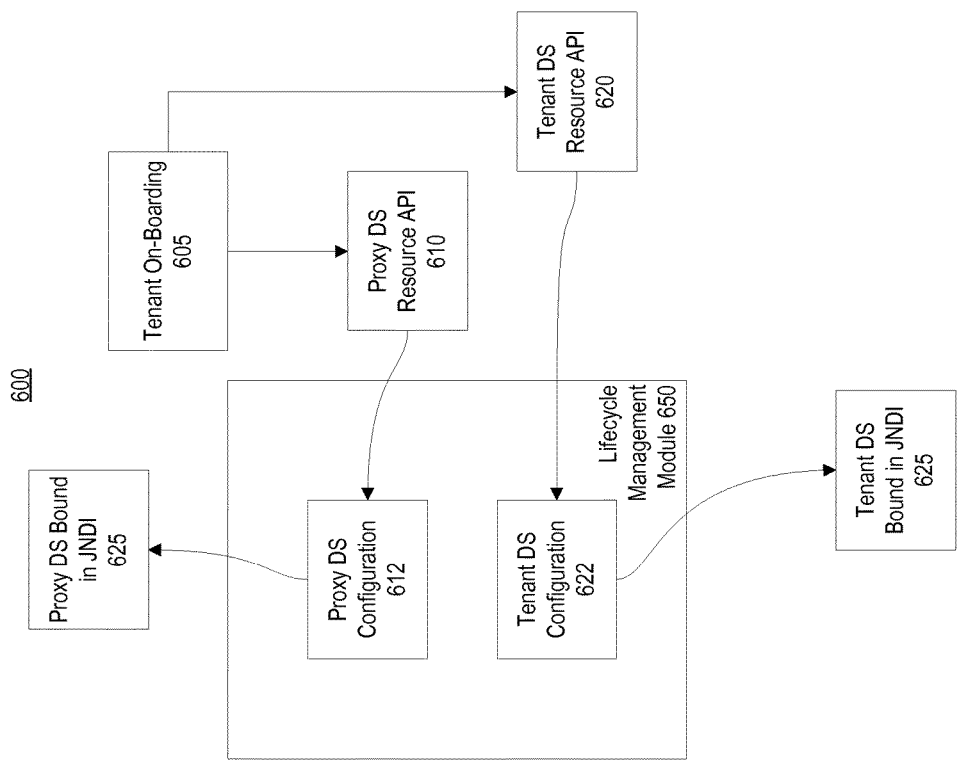
FIG. 6 is an illustration of a use of proxy data sources in a multitenant application server environment, in accordance with an embodiment.

FIG. 6 illustrates the use of proxy data sources in a multitenant application server environment, in accordance with an embodiment. More particularly, FIG. 6 depicts a setup of a proxy DS and a tenant DS in a multitenant application server environment.

As shown in FIG. 6, in accordance with an embodiment, within an application server environment 600, one or more tenants can be on-boarded 605. A proxy data source resource API 610 can receive information about the on-boarding tenant, and pass the information into a lifecycle management module 650, which in turn can update a proxy data source configuration 612. Then, the proxy data source information can be bound into JNDI (Java Naming and Directory Interface) 625.

In accordance with an embodiment, similar to the above, the tenant data source can also be bound into JNDI for future lookup. A tenant data source resource API 620 can receive information from the on-boarding tenant. This information can then be passed into the lifecycle management module 650, which in turn can update a tenant data source configuration 622. Then, the tenant data source information can be bound into JNDI (Java Naming and Directory Interface) 635.

In accordance with an embodiment, dynamic reconfiguration support is available for proxy data source configuration. Because tenants may be on-boarded anytime, it may require updating switching-properties configuration so that administrative applications can look up and use a newly on-boarded tenant's datasource. This is generally not required for the JRF provided switching implementation specific data source mapping in switching properties. This reconfiguration support is useful in the cases where a custom switching implementation is provided and switching properties need to be updated.

Proxy Data Source Administrative Lookup

Figure 7:
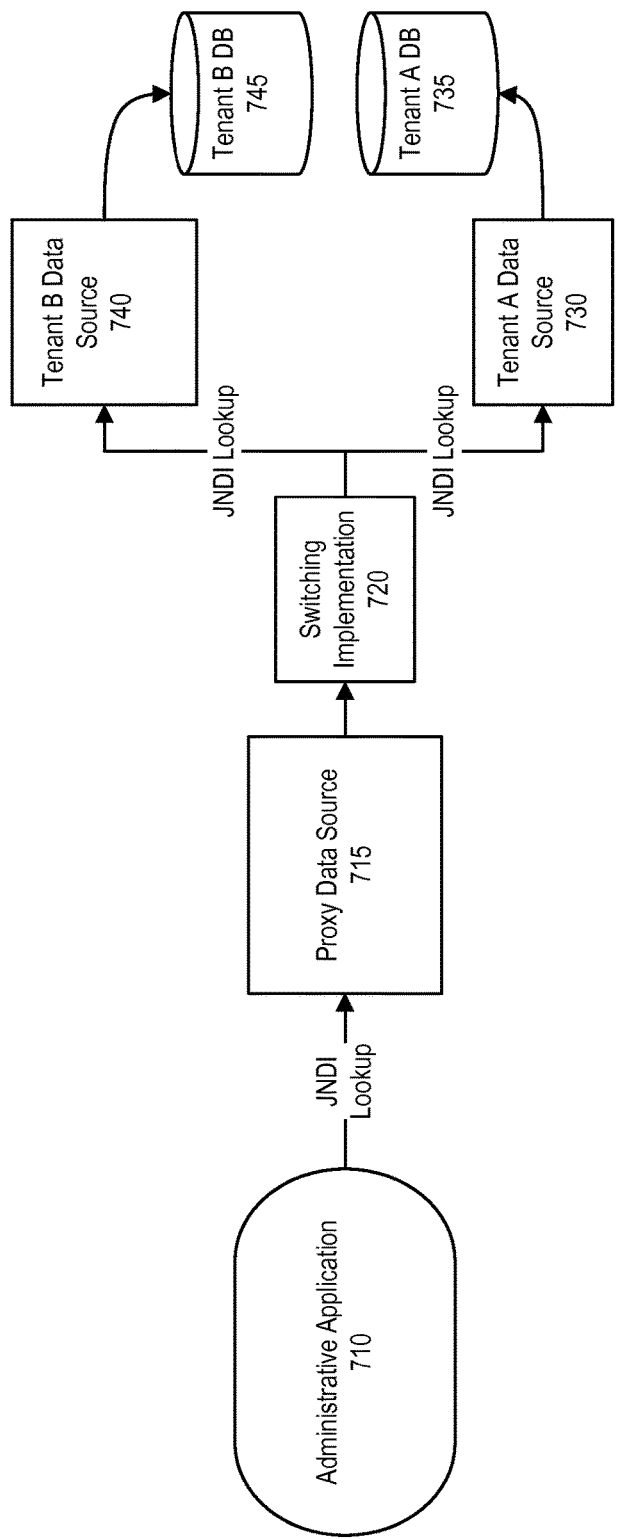
FIG. 7 is an illustration of a use of proxy data sources in a multitenant application server environment, in accordance with an embodiment.

FIG. 7 illustrates the use of proxy data sources in a multitenant application server environment, in accordance with an embodiment. More particularly, FIG. 7 depicts an administrative application looking up a proxy data source in order to access a tenant database in a multitenant application server environment.

In accordance with an embodiment, in order to lookup and/or access a tenant database in a multitenant application server environment, an administrative application 710 can perform a JNDI lookup of a proxy data source 715. The proxy data source 715 can then, based upon the current caller context, utilize the switching implementation to switch between a tenant A data source 730 and a tenant B data source 740. The switching implementation provided is meant to switch data sources across tenants when used via a proxy data source.

In accordance with an embodiment, once the administrative application has accessed the tenant's data source, e.g., tenant A data source 730 or tenant B data source 740, the administrative application can then access the database of the respective tenant, i.e., tenant A database 735 or tenant B database 745. In this way, the administrative application can access each tenant's database by simply accessing a proxy data source 715 instead of separately accessing each tenant's respective data source directly.

Figure 8:
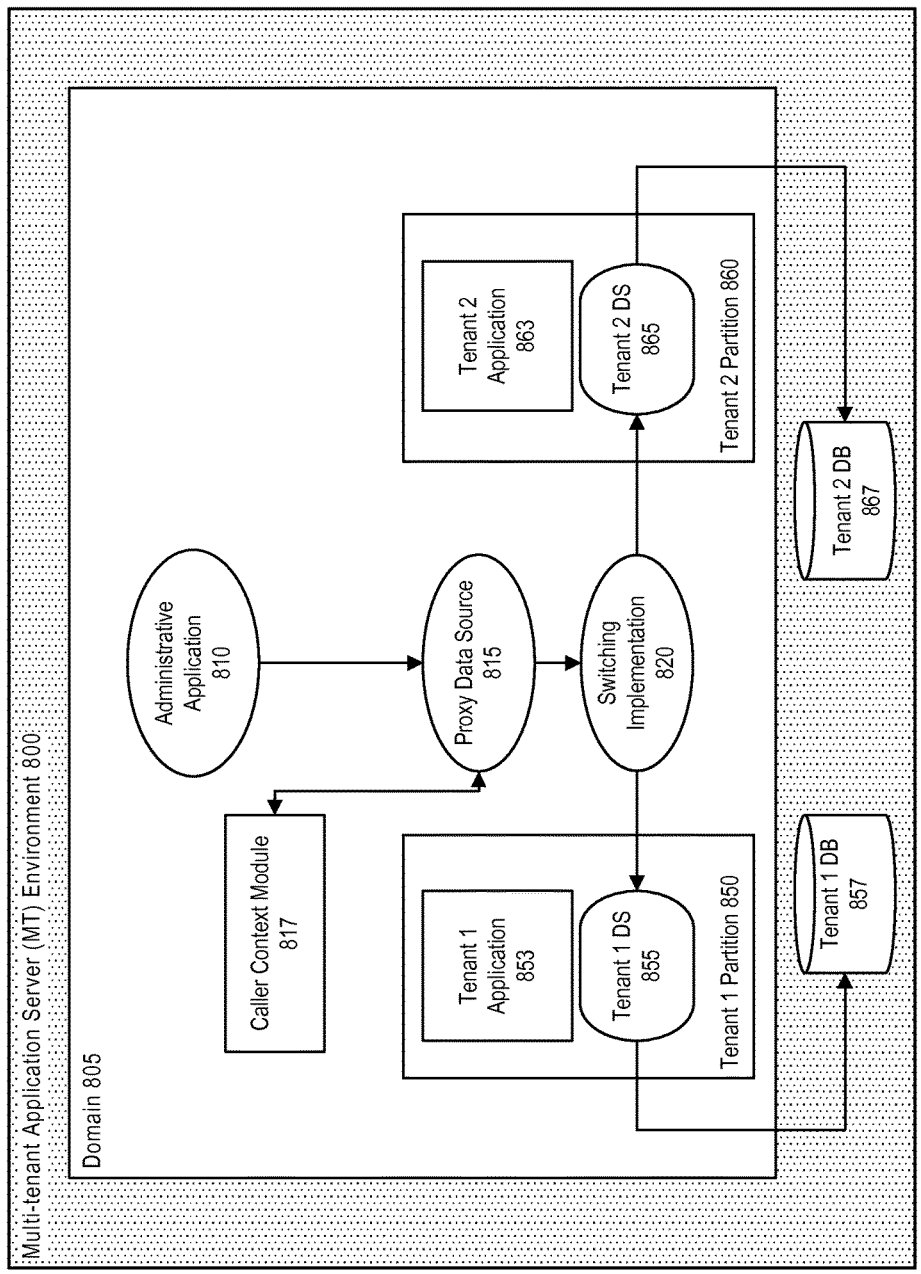
FIG. 8 is an illustration of a use of proxy data sources in a multitenant application server environment, in accordance with an embodiment.

FIG. 8 illustrates the use of proxy data sources in a multitenant application server environment, in accordance with an embodiment. More particularly, FIG. 8 depicts an administrative application looking up a proxy data source in order to access a tenant database in a multitenant application server environment.

In accordance with an embodiment, a multitenant application server environment 800 can include a domain 805, as well as tenant 1 database 857 and tenant 2 database 867. The domain, in turn, can include a number of partitions, such as tenant 1 partition 850 and tenant 2 partition 860. It should be noted that each tenant can be associated with one or more partitions.

The domain 805, in accordance with an embodiment, can further include an administrative application 810, a proxy data source 815 associated with a switching implementation 820, and a caller context module 817 (e.g., tenant context). The tenant partitions can include tenant applications, such as tenant 1 application 853 and tenant 2 application 863, as well as tenant data sources, such as tenant 1 data source 855 and tenant 2 data source 865.

In accordance with an embodiment, in a situation where the administrative application 810 needs to access a tenant database, the administrative application 810 can lookup the proxy data source 815. Based upon the context of the request, as obtained from the caller context module 817 (e.g., the tenant's context, partition's context etc.,), the proxy data source can utilize the switching implementation 820 to direct the lookup from the administrative application to the appropriate tenant data source, i.e., tenant 1 data source 855 or tenant 2 data source 865, which in turn are associated with the respective tenant database, i.e., tenant 1 database 857 and tenant 2 database 867. In this way, the administrative application can lookup and access either tenant 1 or tenant 2 by accessing one data source, which in turn directs to the appropriate tenant based upon the tenant context.

Figure 9:
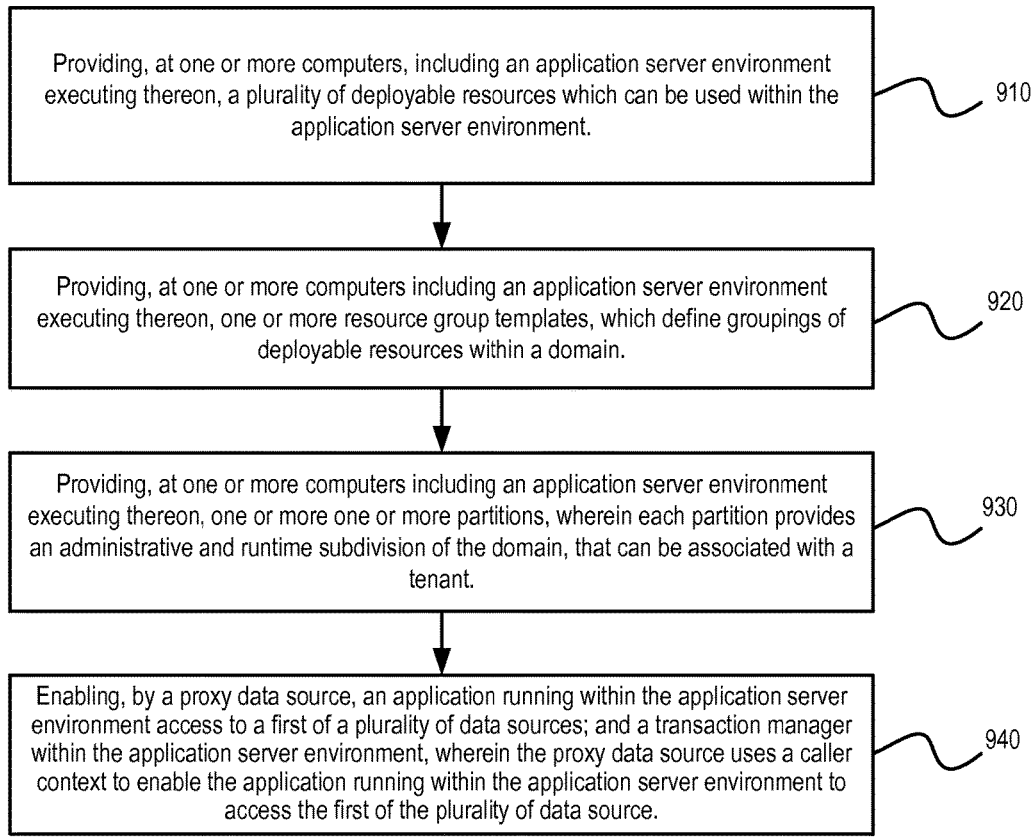
FIG. 9 is an illustrative flow chart of a use of proxy data sources in a multitenant application server environment, in accordance with an embodiment.

FIG. 9 is an illustrative flow chart of a use of proxy data sources in a multitenant application server environment, in accordance with an embodiment.

In accordance with an embodiment, as shown in FIG. 9, at step 910, the method can provide, at one or more computers, including an application server environment executing thereon, a plurality of deployable resources which can be used within the application server environment.

At step 920, the method can, provide, at one or more computers including an application server environment executing thereon, one or more resource group templates, which define groupings of deployable resources within a domain.

At step 930, the method can provide, at one or more computers including an application server environment executing thereon, one or more one or more partitions, wherein each partition provides an administrative and runtime subdivision of the domain, that can be associated with a tenant.

At step 940, the method can enable, by a proxy data source, an application running within the application server environment access to a first of a plurality of data sources; and a transaction manager within the application server environment, wherein the proxy data source uses a caller context to enable the application running within the application server environment to access the first of the plurality of data source.

Java EE Proxy Data Source

In accordance with an embodiment, the proxy data source as described above can provide its services in the context of a Java EE environment. The features provided by the proxy data source can include: JNDI access to a data source object; a data source object that implements javax.sql.DataSource; and, a callback interface that can be implemented to do the data source switching based on the context in the environment (e.g., partition, tenant, etc.). The callback interface can be defined as follows:

```
package weblogic.jdbc.extensions;
public interface DataSourceSwitchingCallback extends Serializable {
// returns null if no datasource is found
DataSource   getDataSource (String   proxyDataSourceName,   String switchingPropertiesString);
}
```

In accordance with an embodiment, a proxy data source can be defined using a jdbc-data-source descriptor that is used for existing WLS data sources. A small sub-set of configuration elements used for a proxy data source can include: 1. Name; 2. datasource-type=PROXY; 3. jdbc-data-source-params proxy-switching-properties—a string defining the means by which switching is done. (This value can be optional and is null if not specified. This value can be configurable and dynamic); 4. jdbc-data-source-params proxy-switching-callback—a string defining the name of a class that implements weblogic.jdbc.extensions.DataSourceSwitchingCallback. (This value can optional and a default callback class will be used for WLS. This value is configurable and dynamic; and 5. jdbc-data-source-params jndi-name—an array of String names at which the data source is mapped into WLS (Java EE) JNDI.

In accordance with an embodiment, a WLS proxy data source does not validate the values in the switching properties to see that either the values match context names or data sources. In the event an invalid data source is specified, a connection will fail.

Java EE—Proxy Data Source Switching Implementation

In accordance with an embodiment, a default implementation for data source switching can be based on partition information i.e., based on partition-data source mapping. If the behavior of the default callback is not appropriate for an application, a custom callback class can be provided. For the default switching callback, the format of the proxy switching properties is "partition1:datasource1, partition2:datasource2, . . . , default:datasourcen". It is passed to the second argument of getDataSource( ) in the switching callback.

In accordance with an embodiment, a default WLS implementation can use a current partition to look up the data source in the switching properties. In a situation where a partition is not currently in use, the value can be set to domain. If no match is found or if not within a partition, the default data source is used. If a default value is not appropriate, then a "default" value should not be provided and a null is returned.

The following rules assume that the JNDI name for the non-partitioned data source is "${JNDINAME}". "${JNDINAME}" can be one or more string values following the rules for JNDI names (the data source making use of data sources with multiple JNDI names).

In accordance with an embodiment, for each data source currently used that needs to be tenant aware the following rules apply within a Java EE environment: there can be a proxy data source defined with a JNDI name "${JNDINAME}". The JNDI name in the resource group template (RGT) can be the name "${JNDINAME}"+"_REAL".

In accordance with an embodiment, a global data source can defined in a resource group at the domain level that utilizes a corresponding RGT. The JNDI name can be automatically generated and the data source can be accessed "domain:${JNDINAME}"+"_REAL" by the switching implementation. If no such global data source is found, an exception can be thrown.

In accordance with an embodiment, there may be multiple partitions that use a corresponding RGT. The JNDI name is automatically generated and the data source will be accessed using "partition:partitionid/$(JNDINAME)+"_REAL" by the switching implementation.

In accordance with an embodiment, Java EE environments can support two attributes: "data source name" and then the data source configuration has "jndi-name" attribute. The switching callback can define the naming convention for jndi-name.

For example, a proxy data source's jndi-name can be jdbc/my-datasource. A data source's jndi-name is expected in resource-group-template to be jdbc/my-datasource_REAL. In accordance with an embodiment, each resource-group that refers the above resource-group-template can, when created, provide a data source by jndi-name jdbc/my-datasource_REAL. (e.g., resource-group in each partition). Then, an administrative application can look up the proxy-data source ("jdbc/my-datasource").

Java EE—Proxy Database Configuration

In accordance with an embodiment, here is an example of a configuration for proxy data source in Java EE:

```
<?xml version='1.0' encoding='UTF-8'?>
<jdbc-data-source
xmlns="http://xmlns.oracle.com/weblogic/jdbc-data-source"
xmlns:sec="http://xmlns.oracle.com/weblogic/security"
xmlns:xsi="http://www.w3.org/2001/XMLSchema-instance"
xmlns:wls="http://xmlns.oracle.com/weblogic/security/wls"
xsi:schemaLocation="http://xmlns.oracle.com/weblogic/jdbc-data-source
http://xmlns.oracle.com/weblogic/jdbc-data-source/1.0/jdbc-data-source.xsd">
<name>ds2</name>
<datasource-type>PROXY</datasource-type>
<jdbc-data-source-params>
<jndi-name>ds2</jndi-name>
<proxy-switching-properties>
default=jdbc/test-datasource;coke=jdbc/test-coke;pepsi=jdbc/test-pepsi
</proxy-switching-properties>
<proxy-switching-callback>
com.oracle.weblogic.lifecycle.core.DataSourceSwitchingCallbackImpl
<proxy-switching-callback>
</jdbc-data-source>
```

Java SE Proxy Data Source

In accordance with an embodiment, for the Java SE environment, a mechanism can be provided to get access to a data source by name based on a particular tenant's context, without an administrative application needing to know the real data sources.

In accordance with an embodiment, as part of the implementation for switchPDBWithTenant on Java SE, data source access can be provided with: a proxy data source (of type javax.sql.DataSource) which supports returning connections from tenant specific data sources based on current (caller's) context; minimal performance overhead; ability to specify database co-ordinates via a common configuration (e.g., lifecycle-config.xml); and, ability to specify multiple data sources per tenant i.e., many proxy data sources and respective tenant specific data sources.

In accordance with an embodiment, a proxy data source and tenant specific data source can be available in JNDI. As tenants may be provisioned or unprovisioned dynamically in the runtime, the respective data sources can also be made available or unregistered dynamically.

In accordance with an embodiment, JNDI access to a data source object can be provided as well as a data source object that implements javax.sql.DataSource, and a callback interface that can be implemented to do the data source switching based on the context in the environment (e.g., partition, tenant, etc.). In accordance with an embodiment, the callback interface can be defined as follows:

```
package weblogic.jdbc.extensions;
public interface DataSourceSwitchingCallback extends Serializable {
DataSource getDataSource (String proxyDataSourceName, String
switchingPropertiesString);
}
```

In accordance with an embodiment, the Java SE mode of proxy data source can allow an FMW component to provision a database before WLS (WLS instances, partitions etc.,) is provisioned. The configuration properties mode can be the same as that of EE mode. Apart from the functionality of proxying and data source switching, SE can utilize a JNDI provider. This can assist with to lookup data sources in JNDI, thereby avoiding writing different set of logic between SE and EE to get access to data source.

In accordance with an embodiment, tenants can define proxy data sources that can switch data sources based on caller's context. These proxy data sources may be configured with switching properties that can be passed to data source switching implementation. The switching implementation can also be made pluggable. Using a configuration property, an alternate switching implementation can be specified. Similar to a setup of a tenant data sources, a proxy data source can be instantiated in the SE runtime (the runtime where FMW components, lifecycle module, and data sources are present) by a proxy data source module.

In accordance with an embodiment, dynamic reconfiguration support is available for proxy data source configuration. "Because tenants may be on-boarded anytime, it may require updating switching-properties configuration so that administrative applications can look up and use a newly on-boarded tenant's datasource. This is generally not required for the JRF provided switching implementation specific data source mapping in switching properties. This reconfiguration support is useful in the cases where a custom switching implementation is provided and switching properties can be updated.

Java SE—Proxy Data Source Configuration

In accordance with an embodiment, the proxy data source configuration for SE mode can be similar to that of EE mode, i.e., the configuration can capture the following details: jndi-name of proxy data source; proxy-switching-class; and proxy-switching-properties. For example, the following example configuration in which data source details are specified:

```
<lifecycle-config>
<runtimes/>
<tenants>
<resources>
<!-- name represents the jndi-name by which the resource can be bound
in JNDI -->
<resource name="jdbc/my-proxy-datasource" type="proxy-datasource">
<property name="proxy-switching-class"
value="oracle.jrf.mt.datasource.DataSourceSwitchingCallbackImpl"/>
<property name="proxy-switching-properties" value=""/>
</resource>
</resources>
</tenants>
</lifecycle-config>
```

Java SE—Tenancy Based Data Source Switching

In accordance with an embodiment, a default switching callback for JRF (Java Required Files) will not need proxy-switching-properties defined. Instead, the default switching callback can rely on naming conventions for the proxy data source, global data source, and tenant data sources. The naming conventions can be different for Java EE, which has a partition-aware JNDI, and SE. The following rules assume that the JNDI name for the non-partitioned data source is "{JNDINAME}". "${JNDINAME}" can be one or more string values following the rules for JNDI names (the data source making use of data sources with multiple JNDI names).

Java SE Switching Implementation

In accordance with an embodiment, for each data source currently used in FMW components that needs to be tenant aware the following rules apply in a Java SE environment. There can be a proxy data source defined with a JNDI name "${JNDINAME}". The FMW components can also have a global data source with a JNDI name "$(JNDINAME}+"_GLOBAL". An exception can be thrown if a data source is not found with this JNDI name related to the global data source.

In accordance with an embodiment, there may be multiple tenant data sources with a JNDI name "${JNDINAME}+"_"+${RESOURCENAME} based on tenancy information. The switching implementation, when called (upon lookup of the current service of the current tenant), can generate ${RESOURCENAME} as "${TENANT_NAME}"+"${SERVICE_NAME}.

In accordance with an embodiment, unlike a Java EE environment, Java SE configuration/API does not have two different attributes, one representing jndi-name of data source and another representing data source-name. Instead, a name parameter, which can be a specified resource via TenantAdmin.createResource(..) API, can be used to bind a data source in JNDI.

For example, a proxy data source's jndi-name can be jdbc/my-datasource. A tenant within the system has the tenant name: foo. A service name is: crm-service. The expected tenant data source JNDI name is then, jdbc/my-datasource_foo_crm-service. The expected global data source JNDI name is then, jdbc/my-datasource_Global. In this situation, an administrative application can lookup the proxy data source, jdbc/my-datasource.

Java SE—Tenant Data Source Setup

In accordance with an embodiment, in a Java SE environment, tenant data sources can be setup by a proxy data source module. These tenant data sources can be specified via lifecycle-config.xml. The proxy data source module can use a configuration to construct a data source instance, which can be bound in JNDI. Administrative applications may get access to the data source similar to how it is done in an EE environment initialContext.lookup("my-proxy-datasource")).

In accordance with an embodiment, as tenants can be on boarded dynamically in the Java SE runtime as well, a tenant's data source can be made available. A proxy data source module can listen to lifecycle configuration change events (e.g. tenant creation etc.,) and register tenant specific data sources in JNDI.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for proxy data source support in a multitenant application server environment, comprising:
   one or more computers, including an application server that enables deployment and execution of software applications, wherein the application server is associated with a domain configuration that is used at runtime to define a domain for execution of the software applications,
   a plurality of partitions, wherein each of the plurality of partitions is associated with a partition configuration, wherein each partition provides a subdivision of the domain and includes at least one data source of a plurality of data sources, and wherein each partition includes one or more resource groups, each resource group being defined by one or more resource group templates; and
   a proxy data source running within the domain, the proxy data source enabling an application running within the domain to access a first data source of the plurality of data sources at a first partition of the plurality of partitions, the proxy data source comprising a JNDI (Java Naming and Directory Interface) name that is not tenant specific;
   wherein the proxy data source uses a caller context to enable the application running within the domain to access the first data source of the plurality of data sources at the first partition of the plurality of partitions.

2. The system of claim 1, wherein the plurality of data sources comprises tenant data sources, each tenant data source associated with at least one of the plurality of partitions, each tenant data source comprising a tenant specific JNDI name.

3. The system of claim 2, wherein the proxy data source is configured to switch the application access from the first data source of the plurality of data sources to a second data source of the plurality of data sources at a second partition of the plurality of partitions, the switching based upon a change in the caller context.

4. The system of claim 2, wherein each of the tenant data sources are further associated with one of a plurality of tenant databases, and wherein the proxy data source further uses the caller context to enable the application running within the domain to access at least one of the plurality of tenant databases.

5. The system of claim 1, further comprising:
   a caller context module, the caller context module providing the caller context to the proxy data source.

6. The system of claim 1, wherein the application server environment supports a Java Standard Edition (SE) environment.

7. The system of claim 1, wherein the application server environment supports a Java Enterprise Edition (EE) environment.

8. A method for proxy data source support in a multitenant application server environment, comprising:
   providing, at one or more computers, including an application that enables deployment and execution of software applications, wherein the application server is associated with a domain configuration that is used at runtime to define a domain for execution of the software applications,
   a plurality of partitions, wherein each of the plurality of partitions is associated with a partition configuration, wherein each partition provides a subdivision of the domain and includes at least one data source of a plurality of data sources, and wherein each partition includes one or more resource groups, each resource group being defined by one or more resource group templates; and
   enabling, by a proxy data source running within the domain, an application running within the domain access to a first data source of a plurality of data sources at a first partition of the plurality of partitions, the proxy data source comprising a JNDI (Java Naming and Directory Interface) name that is not tenant specific;
   wherein the proxy data source uses a caller context to enable the application running within the domain to access the first data source of the plurality of data sources at the first partition of the plurality of partitions.

9. The method of claim 8, wherein the plurality of data sources comprises tenant data sources, each tenant data source associated with at least one of the plurality of partitions, each tenant data source comprising a tenant specific JNDI name.

10. The method of claim 9, wherein the proxy data source is configured to switch the application access from the first data source of the plurality of data sources to a second data source of the plurality of data sources at a second partition of the plurality of partitions, the switching based upon a change in the caller context.

11. The method of claim 9, wherein each of the tenant data sources are further associated with one of a plurality of tenant databases, and wherein the proxy data source further uses the caller context to enable the application running within domain to access at least one of the plurality of tenant databases.

12. The method of claim 8, further comprising:
providing a caller context module, the caller context module providing the caller context to the proxy data source.

13. The method of claim 8, wherein the application server environment supports a Java Standard Edition (SE) environment.

14. The method of claim 8, wherein the application server environment supports a Java Enterprise Edition (EE) environment.

15. A non-transitory computer readable storage medium, including instructions stored thereon for proxy data source support in a multitenant application server environment which when read and executed by one or more computers cause the one or more computers to perform steps comprising:
providing, at one or more computers, including an application that enables deployment and execution of software applications, wherein the application server is associated with a domain configuration that is used at runtime to define a domain for execution of the software applications,
a plurality of partitions, wherein each of the plurality of partitions is associated with a partition configuration, wherein each partition provides a subdivision of the domain and includes at least one data source of a plurality of data sources, and wherein each partition includes one or more resource groups, each resource group being defined by one or more resource group templates; and
enabling, by a proxy data source running within the domain, an application running within the domain access to a first data source of a plurality of data sources at a first partition of the plurality of partitions, the proxy data source comprising a JNDI (Java Naming and Directory Interface) name that is not tenant specific;
wherein the proxy data source uses a caller context to enable the application running within the domain to access the first data source of the plurality of data sources at the first partition of the plurality of partitions.

16. The non-transitory computer readable storage medium of claim 15, wherein the plurality of data sources comprises tenant data sources, each tenant data source associated with at least one of the plurality of partitions, each tenant data source comprising a tenant specific JNDI name.

17. The non-transitory computer readable storage medium of claim 16, wherein the proxy data source is configured to switch the application access from the first data source of the plurality of data sources to a second data source of the plurality of data sources, the switching based upon a change in the caller context.

18. The non-transitory computer readable storage medium of claim 16, wherein each of the tenant data sources are further associated with one of a plurality of tenant databases, and wherein the proxy data source further uses the caller context to enable the application running within the domain to access at least one of the plurality of tenant databases.

19. The non-transitory computer readable storage medium of claim 15, the steps further comprising:
providing a caller context module, the caller context module providing the caller context to the proxy data source.

20. The non-transitory computer readable storage medium of claim 15, wherein the application server environment supports one of a Java Standard Edition (SE) environment or a Java Enterprise Edition (EE) environment.

* * * * *

UNITED STATES PATENT AND TRADEMARK OFFICE
CERTIFICATE OF CORRECTION

PATENT NO. : 9,930,129 B2
APPLICATION NO. : 14/860513
DATED : March 27, 2018
INVENTOR(S) : Felts et al.

Page 1 of 1

It is certified that error appears in the above-identified patent and that said Letters Patent is hereby corrected as shown below:

In the Specification

In Column 14, Line 11, delete ""{JNDINAME}"." and insert -- "${JNDINAME}". --, therefor.

Signed and Sealed this
Twenty-eighth Day of August, 2018

Andrei Iancu
*Director of the United States Patent and Trademark Office*